(12) United States Patent
Bazemore

(10) Patent No.: US 7,925,464 B1
(45) Date of Patent: Apr. 12, 2011

(54) MULTIFUNCTIONAL DISTRIBUTED ANALYSIS TOOL AND METHOD FOR USING SAME

(76) Inventor: Mark Bazemore, Virginia Beach, VA (US)

( * ) Notice: Subject to any disclaimer, the term of this patent is extended or adjusted under 35 U.S.C. 154(b) by 363 days.

(21) Appl. No.: 11/799,591

(22) Filed: May 2, 2007

Related U.S. Application Data

(60) Provisional application No. 60/797,603, filed on May 4, 2006.

(51) Int. Cl.
*G01R 31/00* (2006.01)

(52) U.S. Cl. ........ 702/119; 702/118; 702/121; 715/771; 715/700

(58) Field of Classification Search .................. 702/119, 702/118, 121; 717/122, 124; 715/700, 771
See application file for complete search history.

(56) References Cited

U.S. PATENT DOCUMENTS

| | | | |
|---|---|---|---|
| 5,732,277 A * | 3/1998 | Kodosky et al. | 717/125 |
| 2006/0036656 A1* | 2/2006 | Mercer | 707/203 |
| 2007/0044078 A1* | 2/2007 | Cifra | 717/135 |
| 2007/0294580 A1* | 12/2007 | Lu | 714/33 |

OTHER PUBLICATIONS

Virtins Pocket Multi-Instrument 1.0 Manual © 2007 Virtins Technology(http://www.virtins.com/PocketMultiInstrument Manual.pdf).*

* cited by examiner

*Primary Examiner* — Drew A Dunn
*Assistant Examiner* — Hien X Vo
(74) *Attorney, Agent, or Firm* — Bambi Faivre Walters; Lisa Velez; Heidi Faivre

(57) ABSTRACT

A multi-function, intelligent, distributed analysis test tool (MFDAT) suitable for performing maintenance on complex, sophisticated electronic systems. MFDAT replaces ordinary test instruments such as spectrum analyzers, oscilloscopes, power meters, frequency counters and digital multimeters with modular virtual test instruments that perform the identical functions but use a single display and human interface. Setup information stored internally allows automatic selection and set up the instruments for a particular test. MFDAT provides a "virtual" system to the technician whereby when a second system under test is unavailable, a previous good reading stored by MFDAT is available for comparison. MFDAT provides three operating modes that allow the operator to develop, modify, or refine test procedures, use the embedded test instruments as they would use standard instruments, or to step through predefined test procedures. A go/no-go portion of MFDAT prevents a technician from proceeding past an unacceptable measurement.

33 Claims, 9 Drawing Sheets

Documentation 618

Text 902

System Level Diagram 904

Functional Diagram 906

Schematic Diagram 908

Test Description 910

Component Illustration 912

FIG. 9

MULTIFUNCTIONAL DISTRIBUTED ANALYSIS TOOL AND METHOD FOR USING SAME

RELATED APPLICATION

This application is a Continuation-in-Part of U.S. Provisional Patent Application Ser. No. 60/797,603 filed May 4, 2006 and claims priority thereto in accordance with 35 U.S.C. §119(e).

FIELD OF THE INVENTION

This invention pertains to test equipment for complex systems and, more specifically, to a multi-function, distributed, comprehensive analysis tool for testing complex systems.

BACKGROUND OF THE INVENTION

Evolution in technology has made possible more and more complex electronic and electro-mechanical systems. Large-scale systems may typically be found in such fields as radar, sonar, cable television, broadcasting, television, air traffic control, and satellite communications systems, to name a few. Currently most organizations that own such large scale electronic systems (e.g., the Federal Aviation Administration (FAA), the Federal Communications Commission (FCC), United States Navy (USN), United States Air Force (USAF), United States Marine Corps (USMC), United States Coast Guard (USCG), and United States Army (USA) utilize general purpose test equipment to maintain and repair their systems. Such general purpose test equipment usually consists of single-purpose instruments like oscilloscopes, spectrum analyzers, digital multimeters, logic analyzers, and network analyzers, etc. Technicians typically require weeks of training to acquire sufficient knowledge to operate these various instruments and to properly interpret test results obtained therefrom. Further, such test instruments, for the most part, have no method of storing and recalling the results from previous tests. Therefore, there is an inherent reliance on the technician's experience and memory to understand current test results in a historical context.

In addition, preparing such general purpose test equipment to perform a given measurement requires setting numerous controls to their correct values/positions so that test results may be viewed and interpreted correctly. Technicians are most familiar and experienced with test instruments that they use on a routine basis. Test instruments that they use infrequently are often, coincidentally, more difficult to operate, which results because such instruments typically require a greater degree of interpretation by the technician. In addition, the use and set-up of test instruments is rarely a primary training objective in operation and maintenance schools for complex electronic systems. Consequently, in typical training courses, the test instruments are only covered in enough detail to support basic tests on the system being taught or under test. There appears to be an inverse relationship between the amount of training received and the proficiency required to use many of the more complex test instruments, for example, spectrum analyzers and oscilloscopes. In the long run, this tends to introduce two types of errors into the test process, which affect the quality of the maintenance performed on the system under test. The two types of errors are: errors attributed to incorrect setup of the test instrument itself, and errors attributed to incorrect interpretation of the results from the test instrument. These shortcomings can be significantly reduced or eliminated through the introduction of standardized testing processes and test equipment for complex systems.

The majority of current testing technologies rely on human experience and interpretation to derive test results. While oscilloscopes are excellent devices to display waveform characteristics, specifically period (time), voltage, and wave shape, they rely on visual interpretation by their user to achieve a result. Spectrum and network analyzers provide data that is filtered through fast Fourier transforms (FFTs) and differential equations before display. As with oscilloscopes, the results of FFTs require visual interpretation for analysis.

In the case of an oscilloscope, there is only simple conversion from an electronic signal to a visual representation thereof involved. With spectrum analyzers, there is a conversion and derivation of a group of signals required to develop a visual representation. In other words, the displayed result of a spectrum analyzer or the like is not easily manually linked to one or more input signals.

An instrument that could convert such input signals to digital form, and normalize the signals could provide more consistent analysis and remove a technician's perception errors from the test results. Such an instrument could significantly narrow the kinds, frequency, and degree of errors made by the technician, thereby improving the measurement process by reducing operator error. Such an approach is used in the system and method of the present invention.

Another shortcoming of prior art instruments is that specialized test instruments rarely, if ever, can recall measurements taken at a given test point for comparison with a current measurement. The lack of this ability in current maintenance practices on complex systems demands additional effort on the part of the technician, reduces the availability of the system under test, and increases the overall cost of system ownership. It is estimated that the cost of technical training of maintenance personnel contributes approximately 20% or more to the cost of the employee. It is also estimated that training costs are likely to continue to increase with the increasing complexity of systems requiring maintenance.

The majority of advanced technical schools are designed to familiarize the technician with operational aspects, components, data flow, signal paths, and the capabilities of the system upon which they are being trained. The knowledge gained in training programs at such training schools is volatile and, when not in use, tends to degrade and quickly dissipate. This in turn requires recurrent and expensive retraining or on-the-job training of technicians, which, in turn, limits the availability of both the system under test and the technician while that retraining takes place.

The reference materials for large scale systems are typically technical manuals developed explicitly for each system. These manuals are usually the basis for the training curricula for the system courses including any computer-based training. The manuals, in hard copy form, may be thousands of pages long and include thousands of diagrams. Finding the necessary text and/or diagram(s) pertinent to a particular maintenance or troubleshooting task may be time consuming if not almost impossible. The search process may break the technician's train of thought as well as consume valuable time. Even when the manuals are available in digital form, their lack of integration with the test environment still slows the technician in the performance of his or her duties.

The system and method of the present invention, on the other hand, integrates necessary technical manuals into the test environment, thereby significantly reducing the technician's loss of focus on the system under test. This lowers the amount of time spent acclimating the technician to a specific area or component of the system. Additionally, using relational database techniques, the interactive help feature of the present invention is synchronized with the component that is being tested and analyzed. In other words, the technician saves time in locating the correct text or diagram in the manuals as the inventive system automatically locates such text or diagram depending on the particular component, sub-assembly, area, etc. of the system being tested.

Owners of complex systems, for example, the aforementioned organizations, generally maintain large and expensive technical support staffs for those systems. These technical support staffs are either deployed on-site or remotely from the systems. Typically, the remote support staffs have the more expert technicians who may, for example, have access directly to technical support personnel at the manufacturer of the system being maintained. Communication between the remote and the on-site support personnel is normally accomplished by email, video conference, and voice communication. Unfortunately, today's test equipment generally does not support interactive technical support. The goal of the many organizations owning complex systems is to reduce the number of on-site technical support personnel. This goal places greater demands on fewer personnel and increases reliance on the remote support staff to reduce on-site expert visits. The system of the present invention integrates interactive remote support capability by, for example, applying recent personal computing and communications advances to support near real-time technical interactivity. The use of the inventive system, therefore, has a significant positive effect on the required number of on-site technical support occurrences, the amount of system downtime, and duration of the downtime incidents.

While innovative analytical techniques have been employed in mechanical systems to identify and predict failure modes, rates, and frequencies, these techniques have heretofore not often been applied to many complex electronic systems. Many software techniques that have previously been applied to spatial and pattern recognition systems may, however, also be applied to electronic waveforms and signals. Until recently, one problem with applying such techniques to the analysis of waveforms in the maintenance environment has been the lack of the necessary computer processing power required to support such analysis. The test system of the present invention uses such techniques because microprocessors are currently available which provide such processing capability. Advances in processor capabilities, software, and database technologies all present an opportunity to apply adaptive logic, heuristic, or neural network models that can run on microprocessors such as those found in personal computer class machines. These advances also provide the capability to adapt complex models that can replicate a complex system under test with a far greater degree of accuracy and detail than has heretofore been possible. Such modeling is also provided in the system of the present invention.

SUMMARY OF THE INVENTION

In accordance with the present invention, there is provided a multi-functional, intelligent, distributed analysis test tool (MFDAT) suitable for performing maintenance on complex, sophisticated electronic systems. The MFDAT is an integration of three different technologies to form an intelligent test tool. In one implementation, MFDAT uses modular virtual test instruments in a portable chassis. Ordinary test instruments such as spectrum analyzers, oscilloscopes, power meters, frequency counters, and digital multimeters are replaced with modular virtual test instruments that perform the identical functions but use a single display and human interface, typically a keyboard and pointing device (e.g., a mouse), to control all of the instruments. This reduces the number of pieces of test equipment that a technician must carry and store. In addition, the portable chassis uses a standard personal computer central processor unit that runs on the Windows® or other well-known operating system. Each modular instrument is controlled by and sends measurement results to the CPU so that the technician can use the keyboard, monitor, and mouse to accept or reject settings, review the technical manuals pertaining to the specific portion of the system being tested, and select which instrument he or she wants to use.

The MFDAT has three operating modes that may be selected by the operator at start-up, assuming he or she is duly authorized for the particular operating mode selected. Operating modes are provided which allow the operator to develop, modify, or refine test procedures, use the embedded test instruments as they would use standard instruments, or to step through predefined test procedures.

Setup information stored by MFDAT allows the computer to automatically select and set up the instruments for a particular test routine. This reduces the technician's workload by removing the tedious setup and adjustment routines. In addition, this setup automation eliminates technician error previously occurring in the setup of specialized test equipment of the prior art. However, flexibility to adjust and set up the instruments to the technician's preference is preserved so that, should he or she require a different view (i.e., setup, configuration, etc.), the new configuration may be set up and saved when using the MFDAT system in an administrator mode.

The MFDAT system allows technicians to save their setup, notes, and results. This allows for viewing previous test setups and results and for comparing them to current setups and results. Thus, the technician may readily see whether the system being tested is still operating normally (i.e., as it was operating during the time when the previous measurements were made and saved). This feature is extremely helpful to a technician when troubleshooting complex systems, especially when there is only a single installation of the system at the site. When multiple, identical systems are installed at a site, the technician may, of course, compare a reading of one system to a similar reading obtained from a different system. In other words, for purposes of comparison, the MFDAT system provides a "virtual" system to the technician. Comparative troubleshooting between two identical systems is one of the easiest and fastest methods of determining where a problem exists. When a second system is not available, the next best thing is to be able to see a correct result, for example, a previous good reading stored by MFDAT.

When the MFDAT operator (i.e., technician) is troubleshooting, he or she must have access to documentation (e.g., technical manuals) for the system under test. Such technical manuals may be large, multi-volume documents that may contain as many as 20,000 diagrams. Searching for and finding the correct page to view, and then the correct spot on the page, both consumes time and distracts the technician. Breaking his or her train of thought often causes the technician to repeat steps to regain his or her perspective. MFDAT automatically displays the correct diagrams according to the test point currently being evaluated. This saves time in a number of ways. First, the technician need not sift through thousands of diagrams. Second, the technician is not distracted by the time taken to find the necessary text or diagram so he or she does not repeat steps. Third, the technician wastes no time in determining where on the diagram the test point is located.

When the technician is looking at a test point on MFDAT, he or she can also look at both the current and the historic test readings or results. This aids the technician by providing a quick visual reference (display) of what the test point is supposed to look like, and whether the current test point reading is within a predetermined tolerance. A "traffic light" indicator quickly tells the technician whether the current reading is correct. When operating in the administrator mode, the traffic light verifies the accuracy of the reading. When operating in the maintenance mode, the traffic light controls whether the technician may proceed to the next step in the procedure.

The traffic light indicator is typically a three-color indicator arranged in the likeness of a traditional traffic light. The traffic light's colors are set to green if the reading is well within the predetermined range of acceptable values, yellow if the reading is within the predetermined range of acceptable values but historical data indicates some degradation, and red if the reading is outside the predetermined range of acceptable values. While a "traffic light" having traditional red, yellow, and green colors has been chosen for purposes of disclosure, it will be recognized that either other distinctive colors, forms, or devices may be used to provide similar indications to the technician. It will also be understood that this function may be accomplished by other means, examples of which are a display of key words such as "normal", "degraded", and "malfunction"; or by a bar graph wherein a single bar rises and falls within a range that encompasses zones for normal, degraded and malfunction, and others. Consequently, the invention is not considered limited to the traffic light display, but is intended to cover any and all displays, color patterns, and arrangements suitable for displaying similar types of information.

MFDAT uses either a private or public communications network (e.g., the Internet) for communication between the site and remotely-located technical support personnel. This communications network provides the on-site technician with a method of sharing the readings being observed locally with equipment experts and engineers located at different sites. This helps both the on-site technician and the remote engineer by providing high-level collaboration without requiring the engineer to travel to the site of the system being tested. This communication facility also eliminates the need for the on-site technician to describe the "picture" (e.g., a waveform) he or she is seeing, often losing information in his or her description or interpretation.

Essentially MFDAT provides a new way of conducting maintenance on large, complex electronic systems. The benefits of MFDAT compared to methods of the prior art are: support for the technician in a single centralized location; a reduced number of individual test equipment pieces required for testing; increased measurement accuracy through controlled setup and evaluation of the readings; a collaborative method of off-site support eliminating a need for travel by a remotely-located technician; standard methods of test development; and saving of measured data allowing review of system performance across time as well as comparative troubleshooting.

MFDAT reduces the time required for calibration and alignment of complex systems as diverse as PCS and cellular communications systems, broadcasting systems, commercial, acquisition, and weapons guidance radar and air traffic control, automated assembly lines, flight simulation systems, robotic systems, and remote monitoring systems.

It is, therefore, an object of the invention to provide an intelligent, analysis tool to aid in maintenance and repair of complex systems.

It is another object of the invention to provide an intelligent analysis tool to aid in maintenance and repair of complex systems wherein the functions of individual, single-purpose test instruments are combined in a single test system.

It is yet another object of the invention to provide an intelligent analysis tool to aid in maintenance and repair of complex systems wherein functions of oscilloscopes, spectrum analyzers, frequency analyzers, power meters, digital multimeters, and logic analyzers are included in a single test system.

It is an additional object of the invention to provide an intelligent analysis tool to aid in maintenance and repair of complex systems wherein setup of test instruments is accomplished substantially automatically.

It is a further object of the invention to provide an intelligent analysis tool to aid in maintenance and repair of complex systems wherein the diagnosis and maintenance of a complex system is highly automated by performing standard tests predefined for a particular complex system.

It is another object of the invention to provide an intelligent analysis tool to aid in maintenance and repair of complex systems wherein test measurements may be stored and historical measurements compared with current measurements.

It is an additional object of the invention to provide an intelligent analysis tool to aid in maintenance and repair of complex systems, wherein test probes are connected to predetermined points in a complex system to be maintained or troubleshoot.

It is a further object of the invention to provide an intelligent analysis tool to aid in maintenance and repair of complex systems wherein system documentation such as technical manuals is provided; related text and/or diagrams being provided based upon a particular test being conducted and a test point being evaluated.

It is yet another object of the invention to provide an intelligent analysis tool to aid in maintenance and repair of complex systems having communication capability via a public or private network thereby allowing collaborative interaction between support technicians on-site and technicians located remotely from the site.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 9 illustrates documentation in accordance with the invention; and

DETAILED DESCRIPTION OF THE PREFERRED EMBODIMENT

Figure 1:
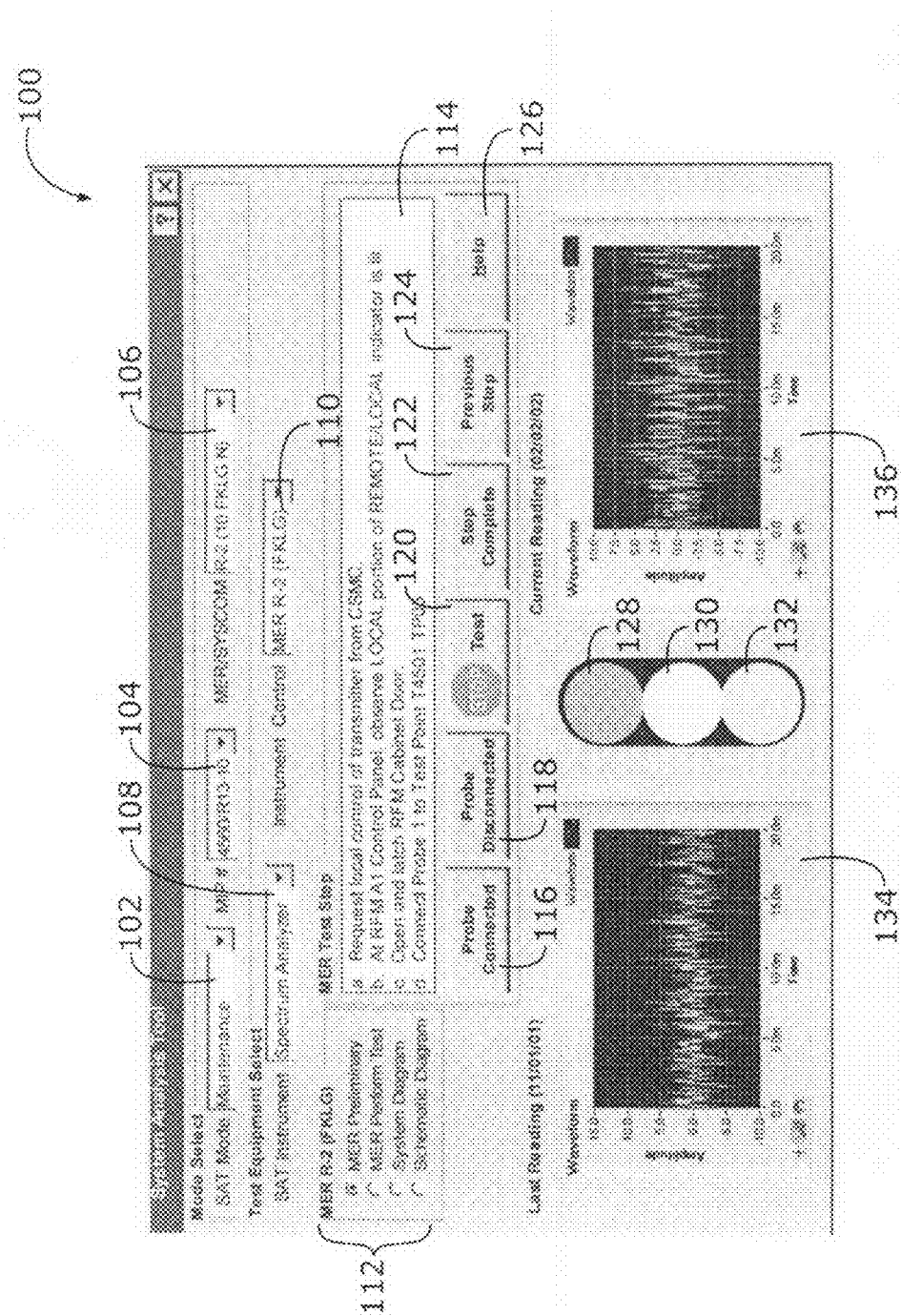
FIG. 1 is screen shot of the Multiple Function Distributed Analysis Tool (MFDAT) or System Analysis Tool (SAT) implementation of the system of the invention.

The present invention features an integrated test system useful for maintaining and servicing complex, large-scale electronic systems. Such systems typically may be found in fields such as radar, sonar, cable television, broadcasting, television, and satellite communications systems, as well as many other fields. One implementation of the inventive system is a Multiple Function Distributed Analysis Tool (MFDAT) which is used for purposes of disclosure. However, it will be recognized that many other implementations of the system and method of the invention are possible. Consequently, the invention includes any and all other implementations supported on any computer system supporting any operating system platform.

MFDAT consists of three primary subsystems: test instruments, hardware, and software. Each subsystem is described in detail hereinbelow. The physical realization of MFDAT is a single chassis containing a processor, human interface components (e.g., display, keyboard, mouse, etc.), and a number of virtual test instruments. As used herein, the term processor is intended to represent a microprocessor or equivalent as well as any and all support needed to form a functional computational system. In the embodiment chosen for purposes of disclosure, the processor is a microcomputer based on an Intel processor chip running Microsoft Windows® as an operating system. The Windows® graphical user interface (GUI) is used by MFDAT. It will be recognized that other processors, operating systems, and user interfaces may be chosen to meet a particular operating requirement or environment, and the invention is not limited to Intel processors and/or the Windows® operating system.

MFDAT replaces the functions of multiple, stand-alone, general purpose test instruments with a single-chassis, computer-supported test system. Typical stand-alone instruments replaced by (i.e., included within) MFDAT are: oscilloscopes, spectrum analyzers, digital multimeters, logic analyzers, network analyzers, radio frequency analyzers, power meters, and the like, all well known to those of skill in the system maintenance arts. It will be recognized that while the functions of specific stand-alone test instruments are typically included in the MFDAT chassis, any piece of general purpose or specialized test equipment may be implemented and included therein. A varying complement of test instruments may be required to service different complex, large-scale systems. Therefore, the invention is not considered limited to the specific test equipment examples used for purposes of disclosure. Rather, the invention includes any combination of general and/or specialized test instruments.

While the functions of the aforementioned test instruments may be realized by purely digital means within MFDAT, for purposes of simplicity, the instrument will be treated as though a physical manifestation of that particular instrument exists. In other words, MFDAT may be said to include an oscilloscope even though an oscilloscope may not be physically present. MFDAT, however, provides the functions normally performed by an oscilloscope. The term "virtual test instrument" is applied to such implementations.

Each virtual test instrument is configured by the processor under control of stored parameters or by the technician using the pointing device (e.g., the mouse) and the GUI. Measurement results from each MFDAT test instrument are displayed graphically and generally stored for later reference.

The MFDAT software has two primary logical subsystems: the human interface and a relational database. The MFDAT software implements a systems analysis tool (SAT), the main screen of which is shown in FIG. 1, generally at reference number 100.

A mode selection scroll box 102 allows selection of three operating modes: maintenance, test development, and administrator. Each operating mode is described in detail hereinbelow. In FIG. 1, maintenance mode is selected.

A Maintenance Index Page (MIP) scroll box 104 allows the technician to select the system under test. MFDAT may, of course, be provided with the necessary data (i.e., test procedures, documentation, etc.) to operate with several diverse complex systems.

A specific test or maintenance procedure (i.e., maintenance request or MR) may be selected using the Mer/Sycom scroll box 106.

A particular test instrument may be selected using the Test Equipment Select scroll box 108, labeled SAT Instrument in FIG. 1. In maintenance mode, only the specific test instruments pertinent to the system undergoing test and the maintenance procedure selected are available for viewing and selection via the Test Equipment Select scroll box 108.

The instrument control scroll box 110 allows the technician to select standard, predetermined instrument settings for the selected test. In maintenance mode, no manual override of these settings is possible. This ensures that tests are conducted consistently and that a less-experienced technician cannot inadvertently set an instrument to an incorrect setting.

A series of four radio buttons 112 allow the technician to select the part of the procedure to be performed. The four selections are: MER Preliminary, MER Perform Test, System Diagram, and Schematic Diagram. Each of these selections is discussed in more detail hereinbelow.

The MR Test Step panel 114 provides the technician with text describing the test step in process, often the step-by-step procedure to perform the selected test.

A series of function tabs 116-126 actually cause MFDAT to perform the desired step or take an action. In the embodiment chosen for purposes of disclosure, the function tabs are: Probe Connected 116, Probe Disconnected 118, Stop Test 120, Step Complete 122, Previous Step 124, and Help 126. It will be recognized that other function tabs may be added or some disclosed function tabs removed in alternate embodiments of the novel system.

A traffic light display is centrally located in a lower region of screen 100. Red 128, Yellow 130, and Green 132 indicators function as a go/no-go indicator to the technician for any selected test. Green indicator 132 indicates that the test result is well within predetermined limits. In one embodiment, a green light indicates a one standard deviation improvement over all previous test averages. It will be recognized that the traffic light display may be programmed to provide other indications based upon different criteria than those chosen for purposes of disclosure.

Yellow indicator 130 indicates that while the test results are within predetermined limits, a possibly significant change between the current result and an historic result has been detected.

Red indicator 128 indicates that the test result is outside predetermined limits. In maintenance mode, a red light prevents the technician from proceeding to the next test until the condition is rectified.

Two result display areas 134, 136 display a historical result 134, and a current result 136, respectively. The nature of the information displayed depends on the test being performed and may be one or more waveforms as seen displayed in regions 134, 136 or numeric data, or text, neither shown.

Probe Connected button 116 is used to inform the system that the probe is connected to the respective test point defined in the test step displayed in MER Test Step panel 114.

Probe Disconnected button 118 informs the system that the probe is no longer connected. Consequently, the system may now perform any necessary data analysis and/or background processing.

Stop/Test button 120 is a binary (i.e., two-state) button that both starts and stops the test process. The test process includes saving current test result data and comparing of that current test result data to historical test result data. Stop/Test button 120 also serves to stop the test in process should the technician desire to do so. Stopping a test may be required if, for example, the technician inserted a probe into Test Point 2 instead of Test Point 1 and wishes to terminate the measurement and/or analysis.

Step Complete and Previous Step buttons 122, 124, respectively, are enabled when the analysis step currently in process is complete and either the Green 132 or Yellow 130 traffic light indicators are illuminated. When the current test step is complete, the next step is displayed in MER Test Step panel 114. Previous Step button 124 allows the technician to review the previous step for purposes of reference.

Help button 126 displays a selection list that includes a text description, if any, for the test point; the appropriate paragraph and reference(s) for the component or sub-system associated with the test point; and the functional and schematic diagrams.

The instrument section 108 allows the technician, by selecting the desired instrument (i.e., view), to view the underlying data from the selected instrument for the current test point. In the embodiment chosen for purposes of disclosure, nine instruments or documentation views are available for selection from the drop down menu or tabular display:

a) Oscilloscope: The oscilloscope displays the current oscilloscope reading, the oscilloscope control settings, as well as the historical oscilloscope display (i.e., waveform) for the current test point;

b) Power Meter: The power meter displays the current power meter reading, the power meter control settings, and the historical power meter reading for the current test point;

c) Frequency Counter: The frequency counter displays the current frequency counter reading, the frequency counter control settings, and the historical frequency meter reading for the current test point;

d) Spectrum Analyzer: The spectrum analyzer displays the current spectrum analyzer reading, the spectrum analyzer control settings, and the historical spectrum analyzer reading for the current test point;

e) Multimeter: The multimeter displays the current multimeter reading, the multimeter control settings, and the historical multimeter reading for the current test point;

f) Logic Analyzer: The logic analyzer tab/sat instrument displays the current logic analyzer reading, the logic analyzer control settings, and the historical logic analyzer reading for the current test point;

g) Schematic View: The schematic view tab displays the schematic view associated with the current test point with the test point graphic centered in the display for the current test point;

h) Functional View: The functional view tab displays the functional (block) diagram current test point, next up component, subsystem or system with the component graphic centered in the display and associated with the current test point; and i) System Configurator: The system configurator tab displays the contents of the latest maintenance requirements (typically distributed on compact disk). This selection is used by the administrator to update the database with any changes to the maintenance procedures and is hidden when the user is not logged into the system as an administrator.

As previously stated, MFDAT provides three distinct modes of operation: test development, administrator, and maintenance modes.

One significant advantage provided by MFDAT is the integration of diverse sets of reference information that a technician may use when testing a complex system. This diverse information is provided to MFDAT from different sources and may be characterized as text, graphics (e.g., system diagrams), and mixed text/graphic documentation for the test instruments themselves.

The first information type is text which describes the maintenance procedure being performed. For example, the text may included a description of the test to be performed, what setup steps must be performed on the system under test, which test instruments are required, a description of how each test instrument must be set up for each specific test point reading, what the expected results are, and in what order the steps are to be performed. This information may be available from an already developed set of procedures for a particular system to be tested. When such information is available, it is parsed and inserted into the appropriate database. For a new system (e.g., a new radar system or simulator), the text may need to be written from scratch, which may be done in the test development mode.

The second information type is the graphical information used to display where in the system under test the technician is currently working. The source of such diagrams is normally, but not always, the technical manuals or computer-based training curricula that are typically prepared for each system to be tested. This graphical information is selectively displayed in both a systemic view that indicates where in the system the technician is currently working and in a functional view showing which sub-system or component on which the technician is currently working. The systemic view provides the technician with a big picture diagram of the system under test while the functional view provides the specific circuit, component, or sub-system in far greater detail. Each of the systemic or functional displays is centered on the current test point as described by the Test Step section 114 of the maintenance screen 100.

The third category of information may be either text of graphics and describes the operation of the currently selected virtual instrument (i.e., the instrument selected in SAT Instrument menu 108). This information is typically displayed when Help button 126 is selected.

This information, regardless of the category, may exist as files that may be converted and imported into the MFDAT. If files do not already exist, information may require scanning from hard copy. Whether the files exist or are created by a scanning process, conversion may be required before their importation into MFDAT. Regardless of their origin, a method to associate the correct diagrams to the current test step/test point is required. This association is created in the test development mode using a graphics mapper. Each of the three information categories are integrated into MFDAT by assignment of unique identifiers to provide the technician with a quick reference to the system under test, the test he or she is performing, and the virtual instruments in the MFDAT.

The inclusion of such extensive documentation within MFDAT frees the technician from the need for hard copy documentation. It is well known that use of hard copy documentation often distracts the technician in the middle of a difficult test procedure. It then requires both time and effort for the technician to again focus his or her concentration on the test itself.

The MFDAT Test Development Mode (TDM) may be used by an original equipment manufacturer (OEM) engineer, or by some other technical expert to develop test procedures for each type of complex system. The term engineer is used hereinafter to describe such a person. Once tests are developed, they may be distributed to the system sites. TDM provides tools for editing text, graphics mapping, instrument control settings, results tolerances, and organization of the test procedure (i.e. renumbering steps, reordering, etc.).

Figure 2:
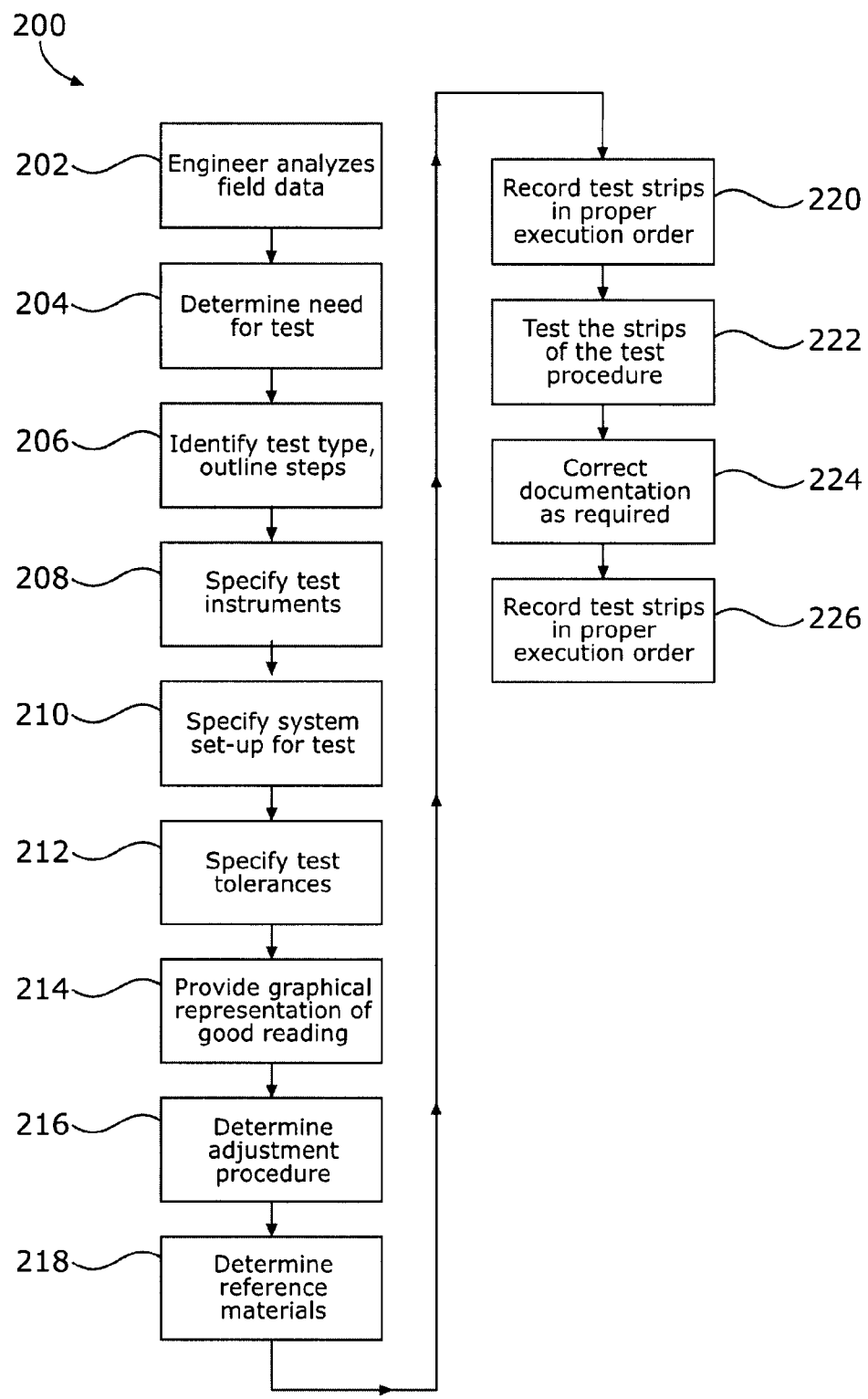
FIG. 2 is a flow chart of a typical test development process performed in test development mode in accordance with the invention.

The documentation (i.e., information) integration is performed in the TDM when the engineer develops a new test. Referring now to FIG. 2, there is shown a flow chart 200 of a typical test development process performed in TDM.

The TDM may be used to create new test procedures or to modify existing procedures. Once an MFDAT system has been deployed in the field for a specific system under test, a large amount of historic measurement data may become available to the engineer. An analysis of this data may be used as the basis for adding a new test or modifying an existing test. When such data is available, the engineer reviews data collected by various MFDAT systems and identifies a trend in the data, step 202. This is done by analysis of the database data that is collected when an MFDAT is used to test a system, that is, when the MFDAT is in maintenance mode.

Next, the engineer determines from the data analysis, step 202, that either a new test of a specific section of the system under test is required, or that an existing test must be modified, step 204. Assuming that historical data is not available to the engineer, the procedure of FIG. 2 generally begins with step 204 and the engineer has used other criteria to determine that a test is required.

The engineer next identifies the type of test that will be required and outlines the steps necessary to conduct the test, step 206.

The engineer then determines what type of test instruments will be used at each test step (e.g., oscilloscope, spectrum analyzer, network analyzer, multimeter, frequency counter, or radio frequency analyzer, etc.), step 208.

The engineer then determines how the system under test is to be setup in order to ensure that the test is properly conducted, step 210. If a system under test has multiple operating modes, for example, in a system adapted for transmission, there may be a fixed frequency, a random frequency mode, and pseudo-random frequency mode. The engineer may designate that the test is to be performed in fixed frequency mode and direct the technician to set the transmitter to fixed frequency mode to conduct the test.

The engineer then identifies the test instrument and the allowable measurement tolerance for the respective test step, step 212. For example, the allowable tolerance may be specified as +/−5% for any of voltage, frequency, or time.

The engineer optionally may provide a graphical representation of how the test instrument display should appear when a measurement is within tolerance, step 214.

The engineer then determines what adjustments may be required to bring the system under test into tolerance and writes the steps necessary to perform those adjustments, step 216.

The engineer develops a list of reference materials for the technician's use while conducting the test, step 218. These reference materials typically include the technical manual reference by volume, any technician's handbook that may be relevant, as well as the text description of the unit or component of the system under test.

The engineer then records the steps and the proper execution order, step 220.

The engineer then "tests" his or her test procedure by stepping through it and highlighting any errors encountered on the actual system under test, step 222.

Finally, the engineer corrects any written documentation used, step 224, and distributes the test, step 226, as part of a test package to sites where the particular type of complex system to which the new test procedure pertains is located. These test packages may be distributed using hard media (e.g., CD ROM, DVD ROM, removable hard drive, external storage device such as a memory card having a USB interface, or any other suitable, portable storage medium). Alternately, the new or revised test package may be downloaded to the remotely-located MFDAT systems over a communications link. It will also be recognized that other methods may be used to provide new or revised test packages to MFDAT systems in the field, and the invention is not considered limited to the distribution methods or media types chosen for purposes of disclosure.

Figure 3:
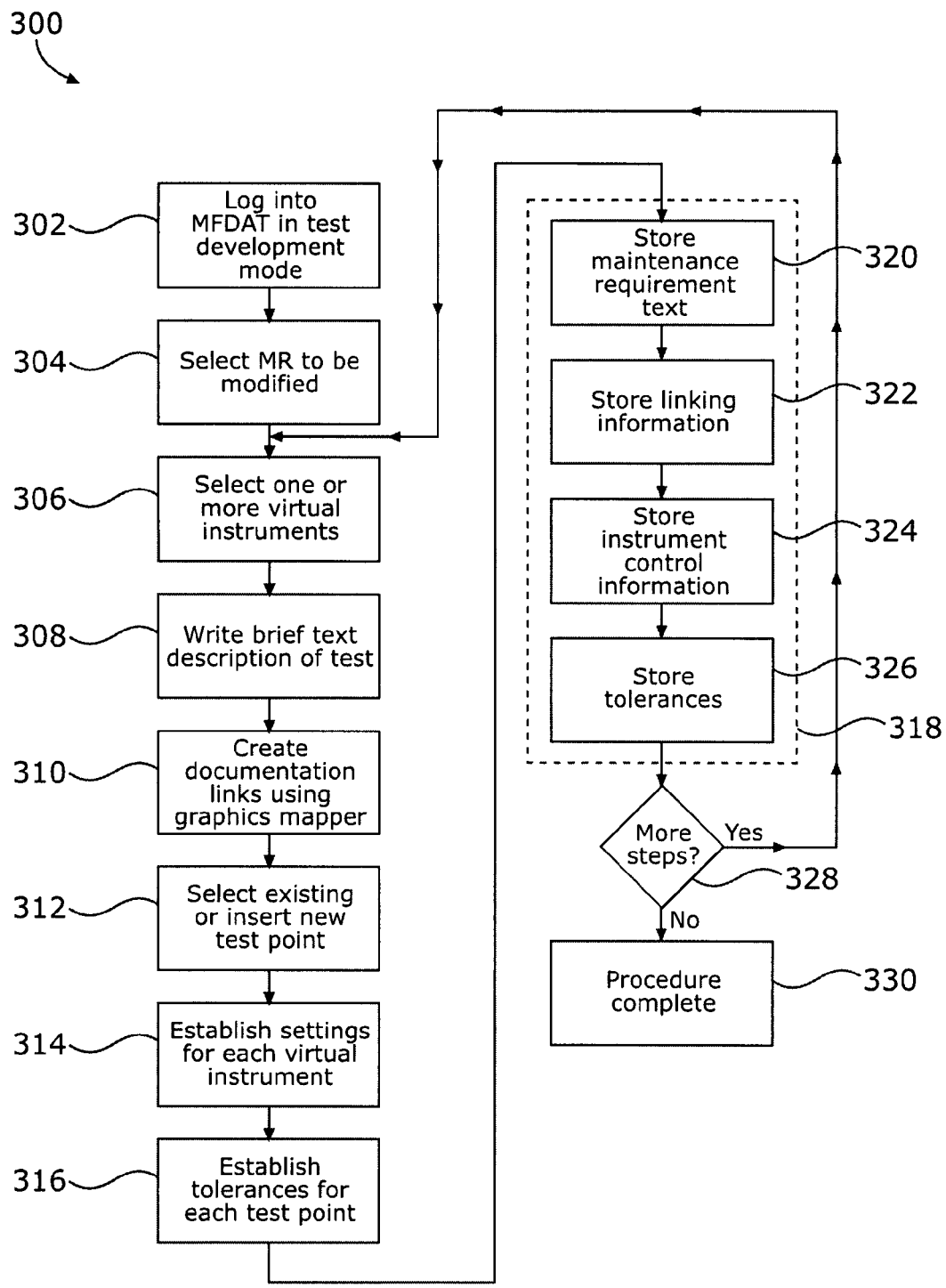
FIG. 3 is a more detailed flow chart of the process used by the engineer to add or modify a test procedure.

FIG. 3 is a more detailed flow chart 300 of the process used by the engineer to add or modify a test procedure in the MFDAT system chosen for purposes of disclosure. The engineer logs into the MFDAT in test development mode (TDM), step 302

The engineer next selects the maintenance requirement (MR) (i.e., test procedure) to be modified or alternately, selects "new" if a new maintenance requirement is being added, step 304. For a new maintenance procedure, a name is assigned by the engineer. This assigned name is used to create an instrument control file, database row, or XML files, none of which are shown, as well as to later identify the specific maintenance procedure.

For each step of the maintenance procedure, step 304, the engineer then selects one or more of the virtual instruments available within MFDAT to perform the required test, step 306. Instrument selection is made by the engineer in the Test Equipment Select area 108 (FIG. 1) of screen 100 (FIG. 1).

The engineer then writes a brief text description of the step in the MR Test Step region 114 (FIG. 1) of screen 100, step 308.

Documentation information is linked to each test step using a graphics mapper, not shown, step 310. The linking of particular documentation to each test step depends upon the portion of the test being performed.

The engineer next selects a test point (if the test point exists), or adds a new test point, step 312.

Settings are next established for each virtual instrument involved in the test step, step 314.

The acceptable range of values for the measurement is established by the engineer, step 316, and the test step is saved, step 318.

Saving the test information, step 318, includes several sub-steps. In the embodiment chosen for purposes of disclosure, SQL is used as a database management tool. Therefore, all portions of the maintenance procedure steps are saved as part of an SQL transaction. The maintenance requirement text is stored, step 320, and the linking information (e.g., coordinates) are stored, step 322. The instrument control information is stored, step 324, and the tolerances are stored, step 326.

If there are more steps to be added, step 328, control is returned to select virtual instrument step 306 and the process continues until there are no more steps to be added or modified, step 328 and the procedure terminates, step 330.

TDM also serves another important function in the MFDAT, that of obtaining baseline data on a new system. As has been discussed hereinabove, when a technician utilizes MFDAT in maintenance mode, each measurement is compared to a historical result for the same measurement (i.e., test procedure). Initially, the historical information for each test may be generated in TDM by the engineer.

One motivation for eventually modifying a test is provided by accumulated data gathered by MFDATs deployed in the field. Analysis of the gathered data may indicate that an additional test is required to properly assess the functioning of the system under test; that a tolerance is too narrow or too wide, etc. The engineer may modify any maintenance requirement as already discussed.

In TDM, the MFDAT also provides a remote monitoring capability, usually accessible across a public or private network typically using TCP/IP or a similar communications protocol. In many cases, the Internet may be used to as a medium for such communications. It will be recognized by those of skill in the data communications arts that many alternatives are available to establish such a communications link. Consequently, the invention is not considered limited to any particular communications link or communications strategy. Rather, the invention covers any and all communications links suitable for connecting an MFDAT to a remote site.

Using the remote communications facility, a remotely located engineer may concurrently view test results with the on-site technician and may make additional tests not necessarily available to the on-site technician as well as modify any of the maintenance procedures stored in the on-site MFDAT.

The final operating mode available in the MFDAT is the administrator mode (AM). AM may be used by the on-site technician to troubleshoot the system under test and conduct non-standard testing, fault detection, isolation, or correction. In AM, each virtual test instrument in MFDAT may be used as though it was a standard, stand-alone test instrument. This ensures that the technician has at his or her disposal all required test instruments without needing six or more pieces of stand-alone test equipment crowding the site.

AM also provides the on-site technician a "virtual" system under test because MFDAT displays the historical data for the test point under test, assuming that the test point has previously been measured. This historical data may be the system baseline data gathered by the engineer in TDM as discussed hereinabove. This virtual system provides the technician with the latest measured data, trending and analysis of multiple historical values, as well as the correct control settings for the virtual instrument as defaults. This provides the technician with the ability to view and analyze the current test point and verify that the current reading is correct as compared to the historical reading(s).

When the current testing involves the first visit to a particular test point, the technician may save the current virtual instrument settings and test data results, perform fundamental signal analysis on the results, and select whether the test point has "passed" or "failed". Whether the test point passes or fails, all the data may be saved. However, for local on-site comparison and analysis, only the "passed" data is used. The "failed" data is stored in the database and can be analyzed by the engineer and used to develop a system level performance measure and to observe trending on the server level system.

Tests developed in AM are not available at other similar sites until reviewed and approved by the engineer and compiled via TDM. The technician, however, has access to all of the standard maintenance requirements. This access provides information allowing error-free setup and testing as well as making available historical data from each test point.

Other functions provided by MFDAT in AM include support and maintenance functions. These maintenance functions allow updating the computer program, upgrading the MFDAT hardware, and network connection control for remote access. AM also provides remote software system and database synchronization to support both intra-site and inter-site collaboration of archived records.

Figure 4:
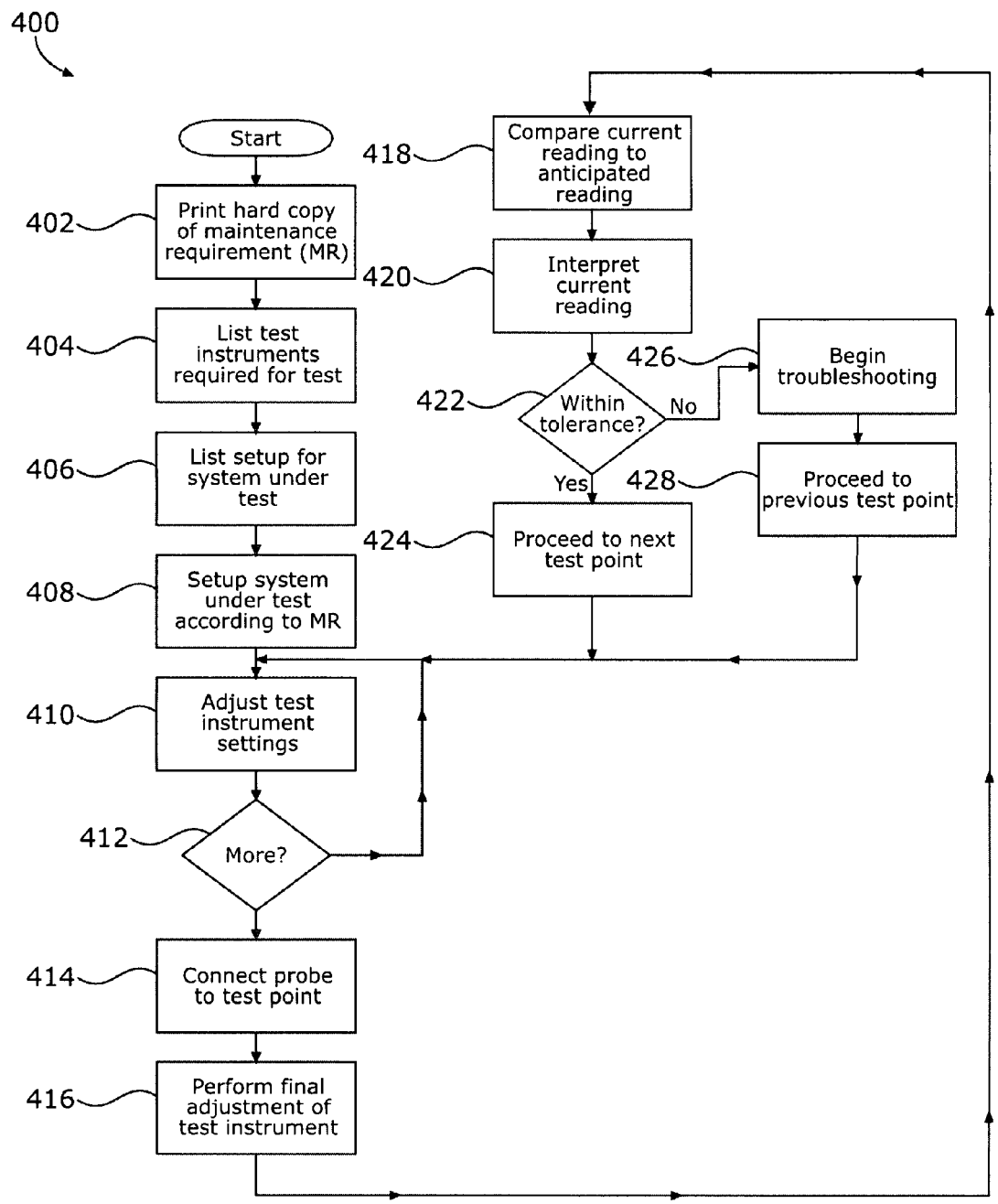
FIG. 4 is a flow chart of a process of performing a maintenance procedure for of the prior art.

The Maintenance Mode (MM) is the least capable mode of operation provided by MFDAT. MM is designed to control the execution of pre-existing maintenance requirements in a way that assures consistent completion of the tests. As such, MM provides the least control over test execution and thereby maximizes the accuracy of the data collected during the test procedures. MM automates the testing process for maintenance activities as described hereinbelow. However, first, the manual procedure of the prior art is presented as shown the in the flow chart 400 of FIG. 4.

First, the technician prints a hard copy of the maintenance requirement (MR), step 402. The MR lists the test instruments required to conduct the test, step 404, and the setup procedure for the system under test, step 406.

Next, the technician sets up the system under test in accordance with the setup requirements of the MR, step 408.

Next, the technician sets up each required test instrument in accordance with the MR. The MR lists the specific test instrument to be used and its detailed settings for each given test point, step 410. If additional test instruments are required for the test, step 412, control is returned to step 410 until all test instruments required for the test have been manually set up.

The technician next connects the probe to the test point being measured, step 414, and performs final adjustments to the test instrument to acquire display (digital readout, waveform, frequency counter, etc.) that is either most convenient for his or her interpretation or is in accordance with a drawing of the anticipated view from the MR, step 416.

The technician next compares the current reading from the test instrument to the anticipated reading from the MR, step 418. This may be, for example, a graph, a set of numbers, a set of tolerances, a minimum value or a maximum value, etc.

Next, the technician interprets the measured value from the test instrument and compares that value to the reference in the MR, step 420.

The technician then makes a decision, step 422, as to whether the current test point reading is correct and if so proceeds to next test point, step 424. Otherwise, the technician begins troubleshooting, step 426.

If the measured value is correct, step 422, the technician may then continue to the next step, 424, and the process continues at step 410. This routine continues until all tests required by the MR have been performed. If, however, the value is incorrect, step 422, and troubleshooting is required, step 426, the technician will typically go back to the test point immediately preceding the test point giving the incorrect reading and recheck that test point, step 428.

If, however, the immediately preceding test point is now incorrect, the technician will then typically work backwards through the foregoing test steps in reverse order until a test point yielding a correct result is found (i.e., a "good" test point). When the technician has found a good test point, he or she will generally begin troubleshooting in the area of the system between the last good test point and the first bad test point.

Figure 5:
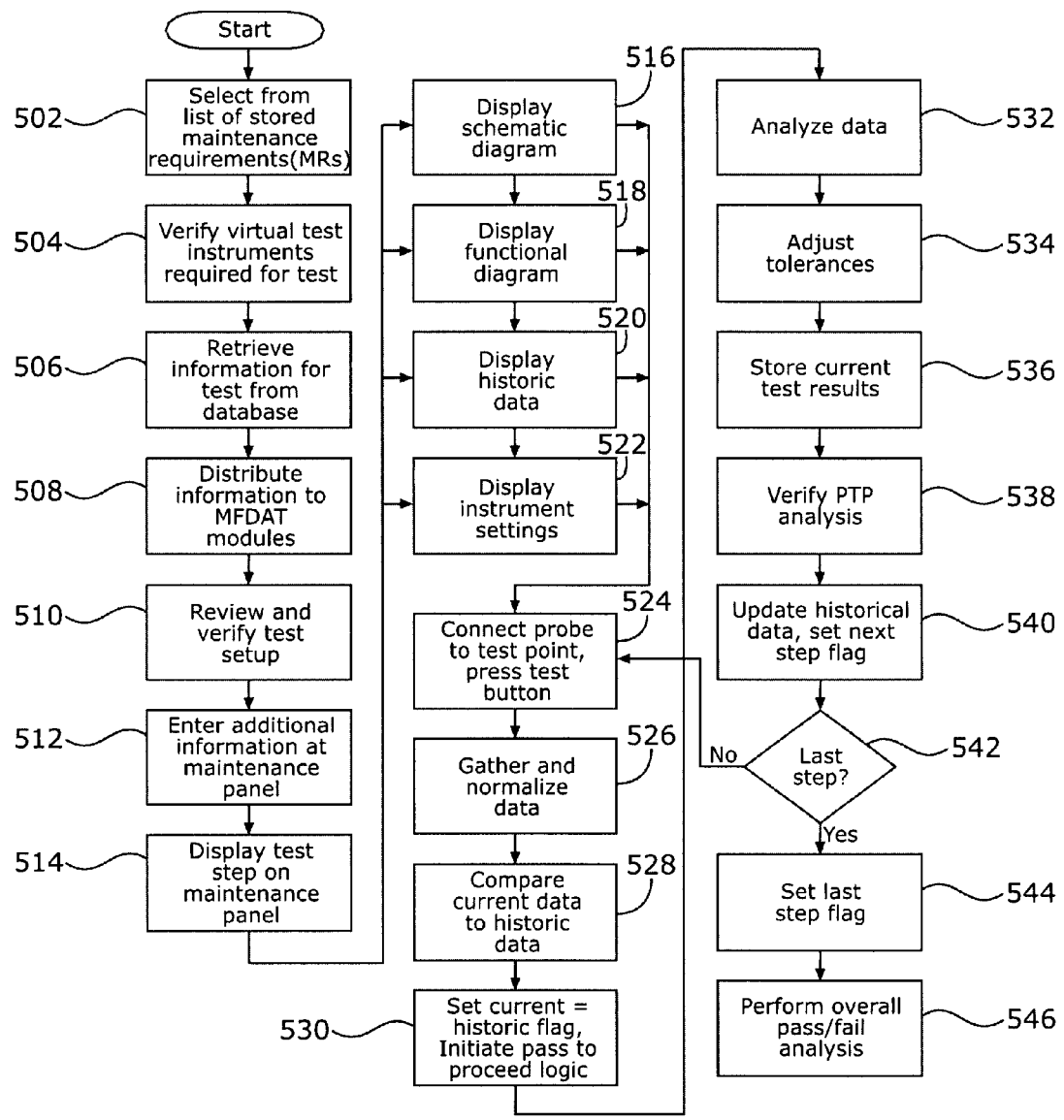
FIG. 5 is a flow chart of the maintenance modes procedure for MFDAT in accordance with the invention.

MFDAT however greatly simplifies this measurement procedure. Referring now to FIG. 5, there is shown a flow chart of the maintenance modes procedure of MFDAT, shown generally at reference number 500.

The technician first selects from the list of stored maintenance requirements (MRs) stored in a database within the MFDAT hardware, step 502

MFDAT next verifies that the virtual instruments required to conduct the test are operable and calibrated via software routines, step 504. As previously discussed, all the virtual instruments may be housed in a single, portable chassis. Generally, all the required instruments are calibrated and operationally checked before use.

In the embodiment of MFDAT chosen for purposes of disclosure, the software generates an SQL transaction, step 506, to retrieve at least some of the following SQL transaction data for the current test point: text data describing the step, a functional or schematic diagram, a system diagram, the instrument control settings for the current step and test point, and historical results for the current step and/or test point. This retrieved information is distributed to the respective modules of the MFDAT application step 508. It will be recognized that while SQL has been chosen as a database management tool in the embodiment chosen for purposes of disclosure, that any other suitable database management tool/query language may also be used. Consequently, the invention is not limited to a particular database system or query language but covers any and all suitable query languages and/or database systems.

The technician may review the setup process if desired and verify the setup, step 510.

Each MFDAT module receives data from both the maintenance panel 100 (FIG. 1) and from SQL conduits, not shown, using an indexing scheme and a key value formed by the MR identification, the test point, and the step identification, step 512.

The maintenance panel 100 displays the current test step, step 514.

Several optional display possibilities are available to the technician. By selecting an appropriate radio button (or tab depending on the particular graphic user interface) 112 on the maintenance screen 100 (FIG. 1), the technician may view his or her desired screen. The system diagram view radio button or tab displays a system diagram (e.g., a functional diagram) that is centered on the system test point of the test step currently being performed. The schematic diagram (i.e., detailed diagram) radio button or tab selects the schematic diagram of the component under test, also centered on the test point being evaluated. The schematic diagram may also provide a graphic representation of the component where the test point being evaluated is located, also centered on the display. Regardless of the documentation mode selected, the portion of the system under test is centered in the display, step 516.

Optionally, the functional view tab causes a schematic diagram to be displayed with the test point typically being centrally displayed, step 518.

Also available for viewing by the technician is the historical data for the selected test point, step 520.

By optionally selecting the instrument tab, the technician may view the current setting for the selected test instrument, step 522.

Once the technician has selected a view, steps 516, 518, 520, 522, he or she connects the test probe to the appropriate test point in the system under test and selects test button 120 (FIG. 1) to begin the automated test process, step 524.

MFDAT then gathers data from the test point and converts the data gathered at the test probe into a normalized data set in accordance with the selected test instrument, step 526.

The compare data mode of MFDAT then compares the currently collected data to stored historical data, step 528. Typically, at least 1000 data points are compared. The allowable tolerance for the data being measured is stored within the MFDAT database, typically as a part of the historical data. The comparison continues continuously thereby allowing the technician to make adjustments to the system under test until the data from the test point is within the specified tolerance. At the completion of the test step, the technician typically activates the Step Complete button 122 (FIG. 1).

Once the current data is within the allowable tolerance, a current=historic flag may be set and pass to proceed (PTP) logic within MFDAT is initiated, step 530. In the MFDAT embodiment chosen for purposes of disclosure, the PTP reviews the currently collected test point data for quality. If analysis of the currently collected data, step 532, shows a difference (i.e., improvement) of more than one standard deviation (calculated from the average of the previous N readings), from the historical mean value, then the tolerance values are set to values of the current reading ±0.5 standard deviations, step 534. If, however, the mean of the currently collected data falls within one standard deviation of the historical mean, then the historical data and the currently collected data are averaged to create a new tolerance value, step 534. The new tolerance value is stored for use in analyzing future measurements at the test point.

At the successful completion of the data collection and analysis (i.e., steps 532 and 534), MFDAT stores the results, typically by initiating one or more SQL transactions to the MFDAT database. First, the current results are stored based upon the key formed by the MR, the test point, and the step identification, step 536.

Next, a trend is calculated to verify that the PTP analysis module correctly analyzed the comparison, step 538.

Finally, the historical results in the MFDAT database are updated, step 540 and MFDAT activates a next step flag indicating that MFDAT is ready to proceed to the next test step upon indication by the technician that he or she is ready. The technician so indicates by activating the Step Complete button 122 (FIG. 1).

If, however, the last test step has been completed, step 542, MFDAT sets a last step flag, step 544. When the last step flag is set, step 544, MFDAT determines whether all steps in the current MR have been passed (i.e., performs and overall pass/fail analysis), step 546. If all steps have been passed, step 546, the technician is allowed to exit the MR. If however, one or more of the steps of the MR have failed, the technician may not exit the MR procedure but is returned to the failed step for retesting and/or troubleshooting or further adjustment of the system under test. The remote mode may be called upon to obtain expert support from an off-site technician in diagnosing and remediating the problem.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Figure 6:
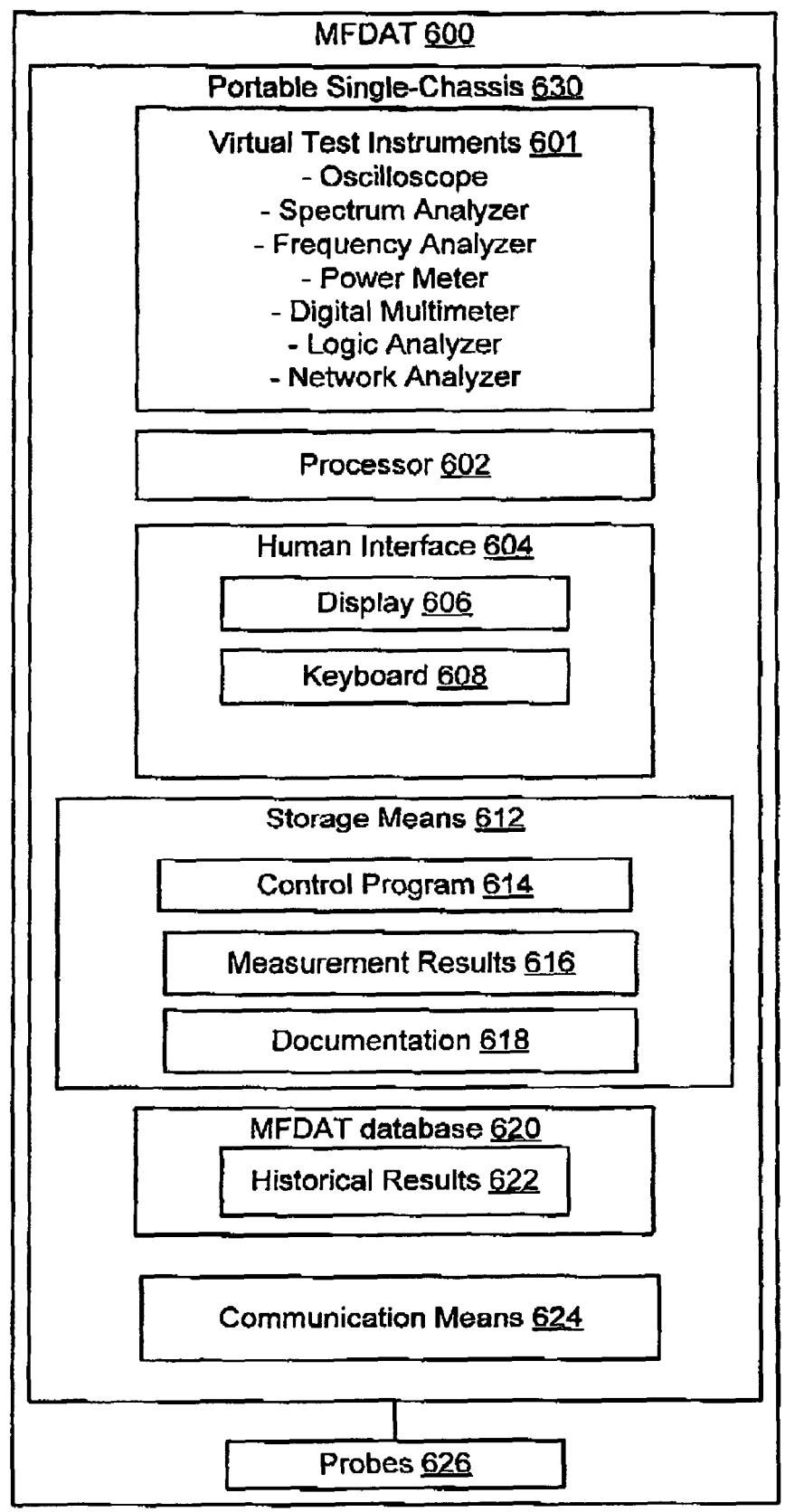
FIG. 6 illustrates a MFDAT in accordance with the invention.

FIG. 6 illustrates a MFDAT in accordance with the invention. The MFDAT 600 comprises at least two virtual test instruments 601 adapted for setup and control. Each of the at least two virtual test instruments 601 are adapted to selectively measure a signal at a system 1000 (FIG. 10) under test disposed externally thereto. Each of the at least two virtual test instruments 601 provide an output signal representative of the respective measured signal.

The MFDAT 600 comprises a processor 602 operatively connected to the at least two virtual test instruments 601 and being configured to select and control the at least two virtual test instruments 601. The MFDAT 600 comprises a means for storing data 612 operatively connected to the processor 602 and having stored therein at least one control program 614 associated with the at least two virtual test instruments 601, and data representative of the output signal (measurement results) 616. The virtual test instruments 601 may include oscilloscopes, spectrum analyzers, frequency analyzers, power meters, digital multimeters, logic analyzers and network analyzers.

The MFDAT 600 comprises a human interface 604 operatively connected to the processor 602. The human interface 604 includes at least a display 606. The at least two virtual test instruments 601, the processor 602, the means for storing 612 and the human interface 604 are disposed within a portable single-chassis (housing) 630. The human interface 604 includes a display 606 and keyboard 608.

Figure 7:
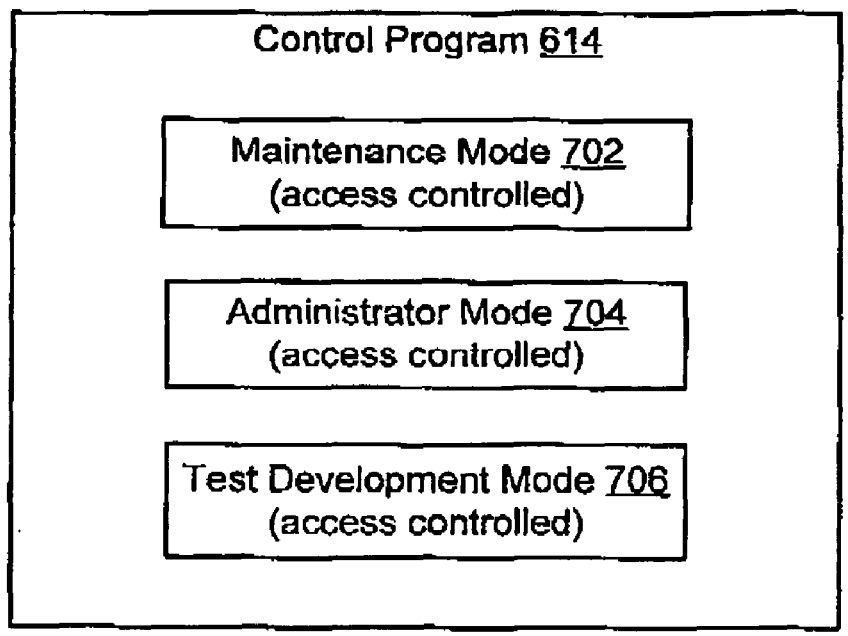
FIG. 7 illustrates a control program in accordance with the invention.

FIG. 7 illustrates a control program in accordance with the invention. The at least one control program 614 comprises at least two operating modes, each selectively available to an operator. The at least two operating modes comprise: a maintenance mode 702, an administrator mode 704, and a test development mode 706. The maintenance mode 702, the administrator mode 704, and the test development mode 706 each comprise means for controlling access thereto, whereby each of the at least two operating modes is available only to the operator authorized to access a respective one of the at least two operating modes.

Figure 8:
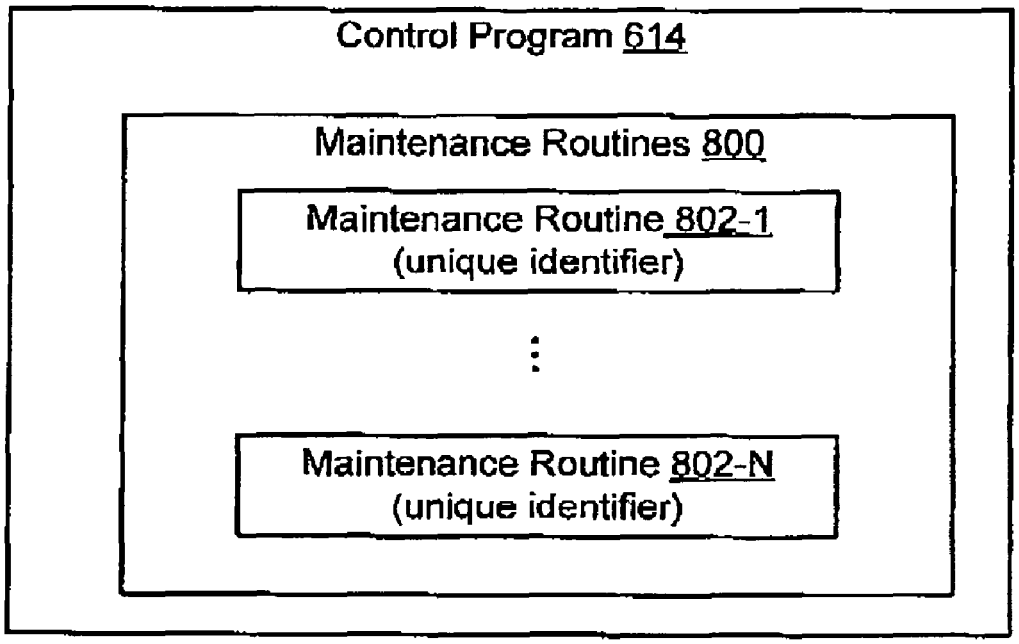
FIG. 8 illustrates a control program in accordance with the invention.

FIG. 8 illustrates a control program in accordance with the invention. The at least one control program 614 comprises at least one maintenance routine 800. The at least one maintenance routine 800 comprises at least two measurement steps, each of the at least two measurement steps being performed by at least one of the at least two virtual test instruments 601. The at least one maintenance routine 800 comprises a unique identifier. The at least one maintenance routine 800 comprises a plurality of maintenance routines 802-1 . . . 802-N, each having a respective unique identifier and being selectively available to an operator of the MFDAT 600.

FIG. 9 illustrates documentation 618 in accordance with the invention. The means for storing data 612 further stores documentation 618 associated with at least one of: the system 1000 (FIG. 10) under test, and at least one of the two virtual test instruments 601.

The MFDAT 600 further comprising means for communicating 624 test results taken by at least one of the at least two virtual test instruments 601 for remote monitoring concurrently with an operator of the MFDAT 600.

The documentation 618 comprises at least one of: text 902, a system level diagram 904, a functional diagram 906, a schematic diagram 908, component illustration 912, and a test description 910.

The at least two virtual test instruments 601 comprise instruments from the group: oscilloscopes, spectrum analyzers, digital multimeters, logic analyzers, and network analyzers.

Figure 10:
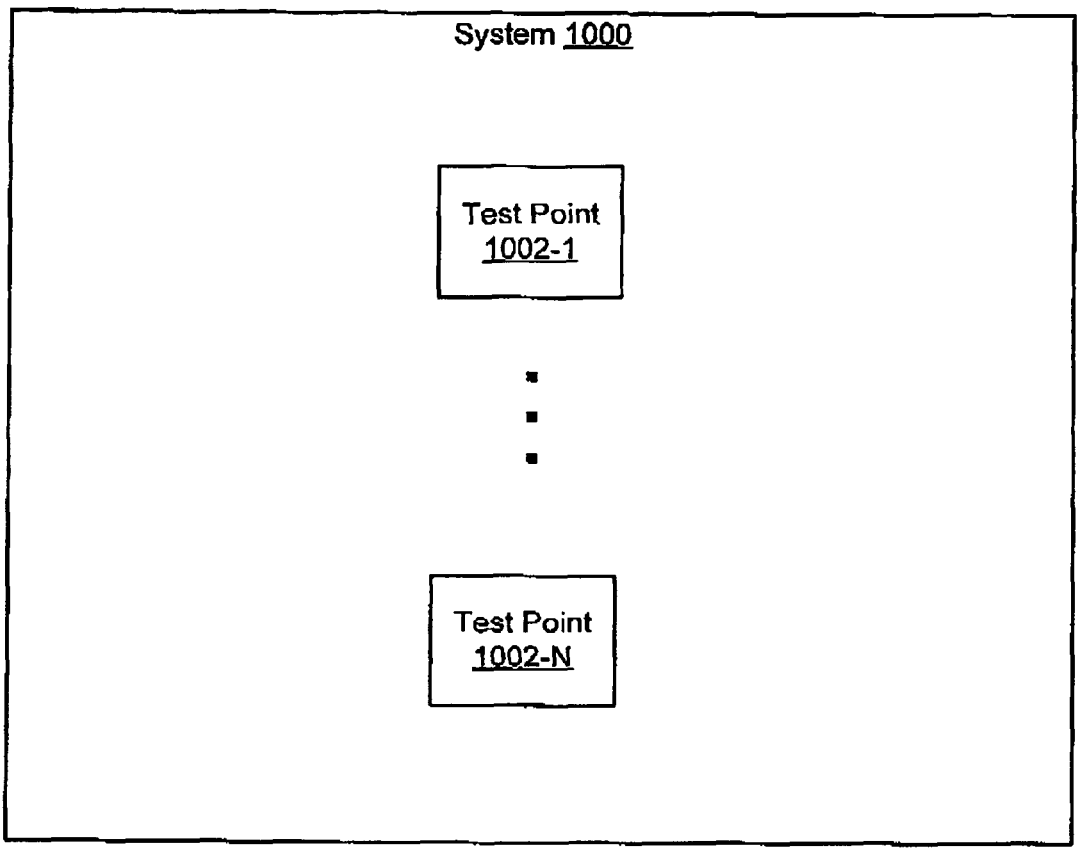
FIG. 10 illustrates a system in accordance with the invention.

FIG. 10 illustrates a system in accordance with the invention. The MFDAT 600 further comprising probes 626 configured to be selectively coupled to a test point of test points 802-1 . . . 802-N in the system 1000 and means for performing a test at the test point using a selected one of the at least two virtual test instruments 601.

Having thus described the invention, what is desired to be protected by Letters Patent is presented in the subsequently appended claims.

What is claimed is:

1. An integrated test tool, comprising:
   a) at least two virtual test instruments adapted for setup and control, each adapted to selectively measure a signal at a selected test point in a system under test disposed externally thereto, each of said at least two virtual test instruments providing an output signal representative of said respective measured signal;
   b) a processor operatively connected to said at least two virtual test instruments and being configured to select and control said at least two virtual test instruments associated with the test;
   c) means for storing data operatively connected to said processor and having stored therein at least one control program associated with said at least two virtual test instruments, and data representative of said output signal; and
   d) a human interface operatively connected to said processor, said human interface including at least a display;
   said at least two virtual test instruments, said processor, said means for storing and said human interface being disposed within a portable single housing.

2. The integrated test tool as recited in claim 1, wherein said tool is configured to automatically display a diagram associated with the selected test point.

3. The integrated test tool as recited in claim 1, wherein said at least one control program comprises a maintenance mode, an administrator mode, and a test development mode and wherein upon selection of the maintenance mode, only the at least two virtual test instruments pertinent to the system undergoing the test and a maintenance procedure selected are available for viewing and selection.

4. The integrated test tool as recited in claim 3, wherein said maintenance mode, said administrator mode, and said test development mode each comprise means for controlling access thereto and wherein the administrator mode is configured to troubleshoot the system under the test and to conduct non-standard testing, fault detection, isolation, or correction.

5. The integrated test tool as recited in claim 1, wherein said at least one control program comprises at least one maintenance routine.

6. The integrated test tool as recited in claim 5, wherein said at least one maintenance routine comprises at least two measurement steps, each of said at least two measurement steps being performed by at least one of said at least two virtual test instruments.

7. The integrated test tool as recited in claim 6, wherein said at least one maintenance routine comprises a unique identifier and in the test development mode, diagrams associated with a current test step or test point are created wherein the diagrams are integrated by assignment of unique identifiers to provide a quick reference to the system under the test, the test being performed, and the least one of said at least two virtual test instruments.

8. The integrated test tool as recited in claim 7, wherein said at least one maintenance routine comprises a plurality of maintenance routines, each having a respective unique identifier and being selectively available to an operator of said integrated test tool.

9. The integrated test tool as recited in claim 6, wherein said means for storing data further stores documentation associated with at least one of the system under the test, and at least one of said two virtual test instruments.

10. The integrate test tool as recited in claim 9, wherein said documentation comprises at least one: text, a system level diagram, a functional diagram, a schematic diagram, component illustration, and a test description.

11. The integrated test tool as recited in claim 1, further comprising means for communicating test results taken by at least one of said at least two virtual test instruments for remote monitoring concurrently with an operator of said integrated test tool.

12. The integrated test tool as recited in claim 1, wherein said at least two virtual test instruments comprise instruments from the group: oscilloscopes, spectrum analyzers, digital multimeters, logic analyzers, and network analyzers.

13. The integrated test tool as recited in claim 12, further comprising probes configured to be selectively coupled to the test point in said system; and means for performing an automated test process at said test point using a selected one of said at least two virtual test instruments.

14. The integrated test tool as recited in claim 1, further comprising:
   means for storing historical test data associated with said test point,
   generating current test data; and
   comparing the historical test data with said current test data.

15. The integrated test tool as recited in claim 1, further comprising a schematic view associated with the selected test point with a test point graphic centered in the display for the selected test point.

16. The integrated test tool as recited in claim 1, further comprising a Functional View: The functional view tab displays the functional (block) diagram current test point, next up centered in the display and associated with the current test point.

17. The integrated test tool as recited in claim 1, further comprising a light display configured to provide indications based upon different criteria wherein the light display comprises:
   a first indicator indicates that while the test results are within predetermined limits, a possibly change between a current result and an historic result has been detected; and
   a second indicator indicates that the test result is outside predetermined limits.

18. The integrated test tool as recited in claim 17, wherein in a maintenance mode, the second indicator prevents the technician from proceeding to a next test until a condition is rectified.

19. The integrated test tool as recited in claim 1, further comprising means for displaying two result display areas configured to display a historical result and a current result.

20. The integrated test tool as recited in claim 1, wherein said tool includes a test development mode, the test development mode is configured to cause the processor to select a maintenance requirement (MR) for modification; select of one or more virtual test instruments; enter a text description of the test; create documentation links; select an existing test point or insert a new test point; provide settings for each virtual instrument; and store tolerances for each test point.

21. The integrated test tool as recited in claim 1, wherein said at least two virtual test instruments comprise an oscilloscope, a frequency counter, and a digital multimeter.

22. The integrated test tool as recited in claim 21, wherein said at least two virtual test instruments further comprise a spectrum analyzer, a network analyzer and a logic analyzer.

23. A method of maintaining a complex electrical or electronic system, the method comprising the steps of:
   (a) providing portable integrated test tool comprising at least two virtual test instruments adapted for setup and control, each of said at least two virtual test instruments being adapted to selectively measure a signal associated with said complex system, said integrated test tool being disposed externally thereto, each of said at least two virtual test instruments providing an output signal representative of said measured signal; a processor operatively connected to said at least two virtual test instruments and being configured to select and control said at least two virtual test instruments; means for storing data operatively connected to said processor and having stored therein at least one control program associated with said at least two virtual test instruments, and data representative of said output signal; and a human interface operatively connected to said processor, said human interface including at least a display wherein said at least two virtual test instruments, said processor, said means for storing and said human interface being disposed within a portable single housing;
   (b) using said integrated test tool to measure a signal at least one predetermined test point associated with said complex system to create a measured value representative thereof;
   (c) comparing said measured value to at least one of the group: a known good, previously-measured value associated with said at least one test point stored in said integrated test tool, and a previously determined value stored in said integrated test tool; and
   (d) analyzing a result of said comparing step (c) to determine a condition of said complex system.

24. The method of maintaining a complex electrical or electronic system as recited in claim 23, wherein said using step (b) comprises the sub-step:
   (i) using information stored in said means for storing data to configure at least one of said at least two virtual test instruments to perform a measurement associated with said at least predetermined test point prior to performing said measurement thereat.

25. The method of maintaining a complex electrical or electronic system as recited in claim 24, wherein said using step (b) further comprises the sub-step:
   ii) storing said measured value in said means for storing data to provide a previously measured value associated with said at least one test point.

26. The method of maintaining a complex electrical or electronic system as recited in claim 24, wherein said comparing step (c) comprises comparing said measured value to at least two known good, previously-measured values associated with said at least one predetermined test point, said at least two known good, previously-measured values being stored in said means for storing data.

27. The method of maintaining a complex electrical or electronic system as recited in claim 26, wherein said analyzing step (d) comprises computing at least one of: a standard deviation and an historical mean of said at least two known good, previously-measured values.

28. The method of maintaining a complex electrical or electronic system as recited in claim 26, wherein said analyzing step (d) comprises determining a pass/fail status of said measured value associated with said at least one test point.

29. The method of maintaining a complex electrical or electronic system as recited in claim 23, wherein said providing step (a) comprises providing said integrated test tool with documentation associated with said complex system stored in said means for storing data, and wherein said integrated test tool provides to a user thereof at said human interface, documentation specifically associated with said at least one test point.

30. A method for maintenance of a complex electronic system using an integrated test tool having a single portable housing with at least two virtual test instruments, a processor and a display integrated in said housing, the method comprising the steps of:

measuring a signal at a selected test point in the system under test disposed externally thereto using at least one virtual test instrument of the at least two virtual test instruments, the at least one virtual test instrument is assigned to the test;

providing a measured value representative of said respective measured signal by said at least one virtual test instrument to create a measured value;

comparing said measured value to at least one of the group: a known good, previously-measured value associated with said selected test point stored in said integrated test tool, and a previously determined value stored in said integrated test tool, wherein said comparing step comprises the step of comparing said measured value to at least two known good, previously-measured values associated with said test point, said at least two known good, previously-measured values being stored in said tool;

analyzing a result of the said comparing step to determine a condition of said system, wherein said analyzing step comprises the step of computing at least one of: a standard deviation and an historical mean of said at least two known good, previously-measured values;

storing said measured value in the tool to provide a previously measured value associated with said test point.

31. The method as recited in claim 30, wherein said analyzing step comprises the step of determining a pass/fail status of said measured value associated with said selected test point.

32. The method as recited in claim 30, further comprising, during a test development mode, the steps of:

receiving a selection of a maintenance requirement (MR) for modification;

receiving selection of one or more virtual test instruments;

receiving a text description of a test;

creating documentation links;

receiving a selection of an existing test point in the system or insertion of a new test point;

receiving settings for each virtual instrument to be used in the test; and storing tolerances for one or more test points in the system.

33. The method as recited in claim 30, further comprising the steps of:

indicating by a first indicator that while test results are within predetermined limits, a possible change between the measured value and the known good, previously measured value has been detected; and indicating by a second indicator that the test result is outside predetermined limits.

* * * * *